March 18, 1969     A. L. NASVYTIS     3,433,099
MULTI-ROLLER FRICTION DRIVE WITH CONICAL PRELOAD MECHANISM
Filed Nov. 21, 1967
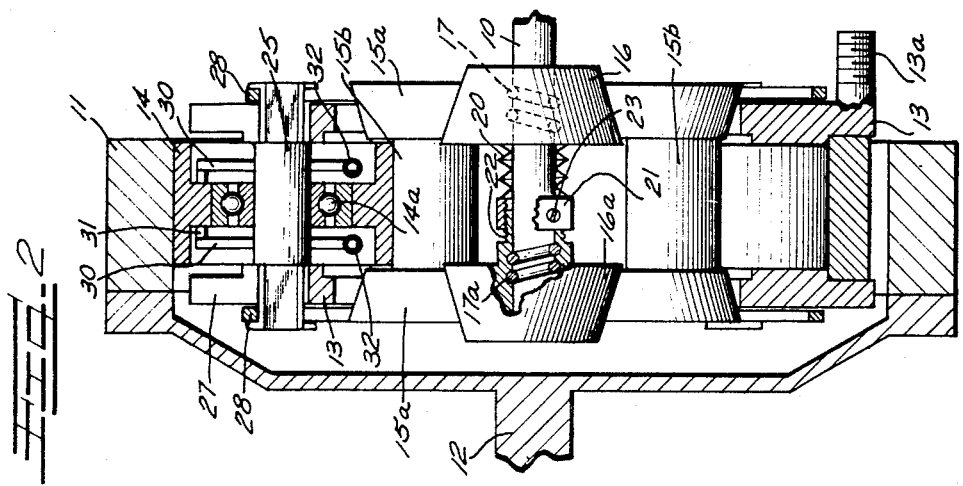
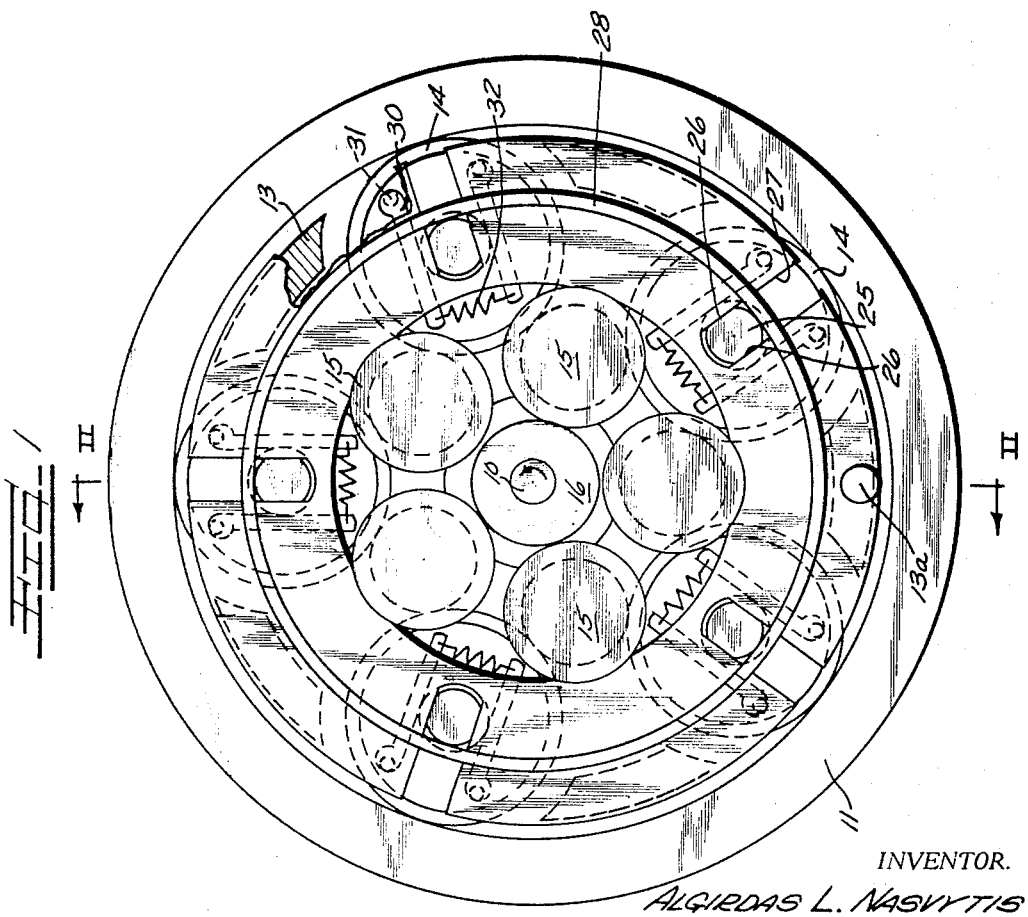
INVENTOR.
ALGIRDAS L. NASVYTIS
BY *Hill, Sherman, Meroni, Gross & Simpson* ATTORNEYS

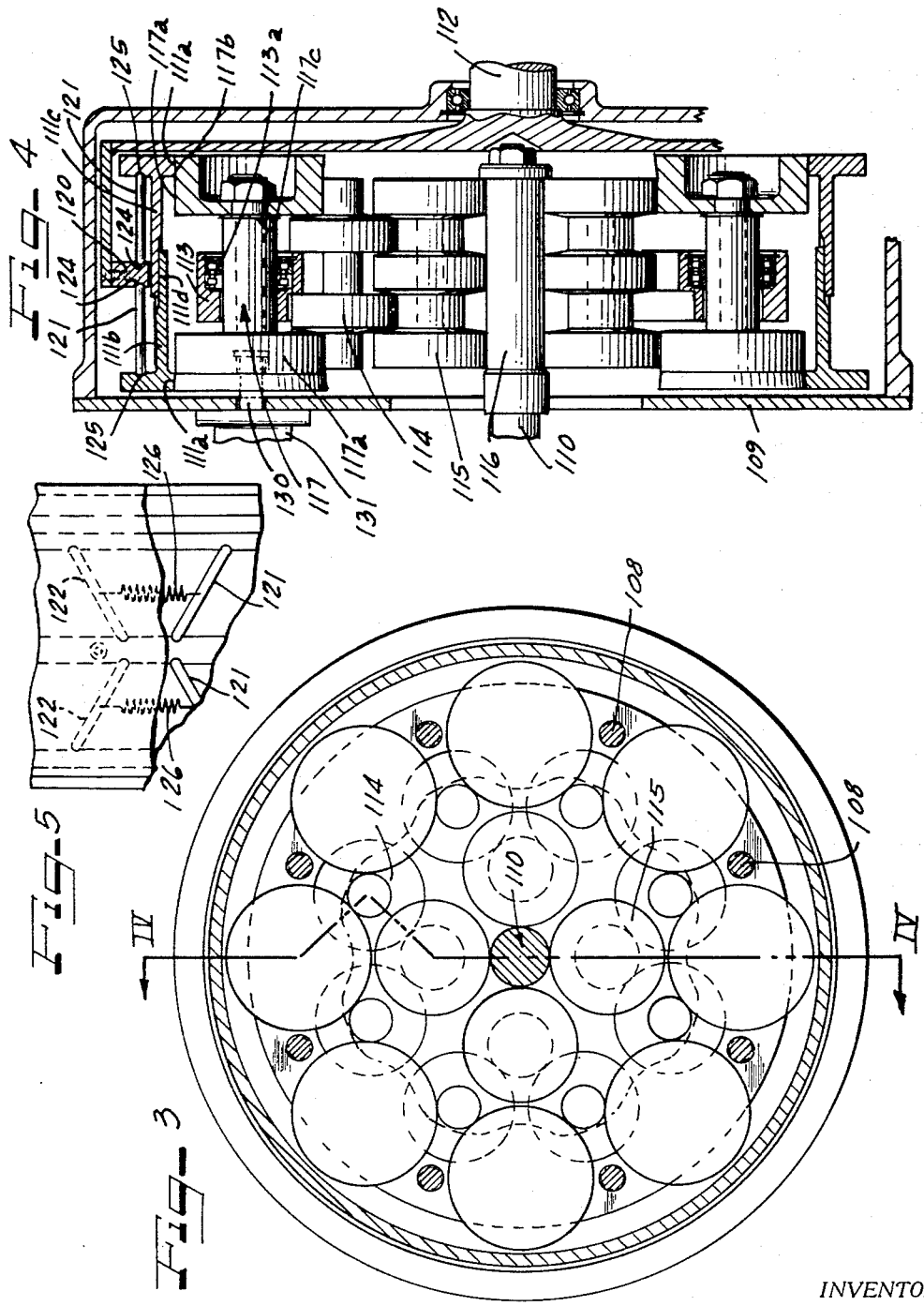

United States Patent Office 3,433,099
Patented Mar. 18, 1969

3,433,099
MULTI-ROLLER FRICTION DRIVE WITH CONICAL PRELOAD MECHANISM
Algirdas L. Nasvytis, Cleveland, Ohio, assignor to TRW Inc., Cleveland, Ohio, a corporation of Ohio
Continuation-in-part of application Ser. No. 514,082, Dec. 15, 1965. This application Nov. 21, 1967, Ser. No. 689,228
U.S. Cl. 74—798                         16 Claims
Int. Cl. F16h 13/06

ABSTRACT OF THE DISCLOSURE

A friction drive system incorporating complementing frusto-conical planetary elements automatically loaded to provide an increasing drive contact pressure with increased torque, in at least one direction of rotation.

Background of the invention

This application is a continuation-in-part of my allowed copending application Ser. No. 514,082, now abandoned, filed Dec. 15, 1965. Prior art developments in the field of friction planetary gearing have included various means for increasing the preload in one or both directions of gear rotation. There have, of course, been many one-way clutch devices proposed in the prior art. One-way clutch mechanisms have found great utility in the automotive field in the hill-hold devices, and enumerable related areas. However, to my knowledge, no simple, combined reducing apparatus coupled with a one-way automatic clutch has been provided. The present invention contemplates the provision of a properly preloaded friction drive which operates to transmit torque smoothly and efficiently in at least one direction of relative rotation with the automatic application of increasing preload with the transmission of drive torque and which may be arranged to remove all torque transmission upon rotation of the input shaft in a reverse direction.

In accordance with the principles of the present invention, a rotating sun shaft member is mounted for rotation in either direction, a plurality of planet type members are equally peripherally spaced about the sun shaft in friction drive contact therewith. A further, second, row of planet type friction rollers is positioned in drive contact with the first row and is, in turn, positioned for friction drive contact with the internal surface of a rotatable ring member. In a preferred form of the present invention, a cage is provided for fixedly peripherally spacing the rollers of the second row relative to each other and relative to the housing of the apparatus. The cage provides, however, for radial movement of the rollers to permit an increase or decrease in the radially outwardly acting contact between the second row rollers and the ring gear. In accordance with a preferred embodiment of the present invention, the first row of planet type rollers is provided with conical torque transferring surfaces cooperatively engaged with mating conical surfaces carried by the input, or sun, shaft. Cam means are provided for axially moving certain of the conical surfaces upon rotation of the sun member in one direction relative to the ring, with the resultant radial expansion of the first row of rollers and with increased force contact occurring between the first row of rollers and the second row of rollers and, accordingly, between the second row of rollers and the spring. Spring means are provided in this embodiment for smoothly providing a transition between no torque and full torque load characteristics and, for resiliently strongly biasing the parts into a condition in which no preload is provided between the planets and the ring gear and in which no torque will be transferred. Rotation of the input shaft in the opposite direction provides manipulation of a conical surface to assure positioning of the two rows of planet roller members at their radially innermost condition in which the last row rollers are disengaged from the output ring and no torque is transferred between the input and output shafts.

In another embodiment of the invention, the second row of planet type rollers is provided with conical torque transferring surfaces cooperatively engaged with mating conical surfaces carried by the output or ring member. Cam means are provided for axially moving certain of the conical surfaces upon rotation of the sun member in at least one direction of relative rotation, with the resultant radial expansion of the second row of rollers with increased force contact occurring between the mating conical surfaces. Further, in the embodiment under discussion, means may, if desired, be provided to automatically cause increased co-operation between the second row of rollers and the ring member independently of the direction of rotation to thereby provide automatically an increasing force contact between the cooperating conical parts with increased torque transmission, independently of the relative direction of rotation. Resilient means may, again, be provided for holding the planet rollers in contact with each other and with the sun in order to provide an initial drive contact between the parts.

It is, accordingly, an object of the present invention to provide a new and improved friction drive mechanism providing automatic preloading of the drive components in one or both directions of drive rotation.

Another object of the present invention is to provide an integrated one-way clutch and friction reduction gear drive device.

Still another object of the present invention is to provide a smoothly operating, self-aligning, one-way clutch mechanism.

A feature of the invention resides in the provision of opposed frusto-conical rollers in a planetary drive system, arranged for axial movement upon variations in drive torque.

Yet another feature of the invention resides in the provision of specifically controlled brake elements acting in co-operation with the planet rollers of a planetary friction drive system.

Yet another object of the present invention is to provide a properly adjusted one-way overrunning drive system providing an adjustable preload one-way friction drive with substantially positive engaging means and complete disengagement characteristics.

Still other and further objects and features of the invention will at once become apparent to those skilled in the art from a consideration of the attached drawings wherein preferred embodiments of the invention are shown by way of illustration only, and wherein:

FIGURE 1 is an end-elevational view of a planetary drive constructed in accordance with the present invention to provide a one-way drive system;

FIGURE 2 is a side-elevational view in partial cross-section taken along the line II—II of FIGURE 1;

FIGURE 3 is an end-elevational view of a planetary drive constructed in accordance with a further embodiment of the present invention;

FIGURE 4 is a side-elevational view in partial cross-section taken along the line IV—IV of FIGURE 1; and FIGURE 5 is a partial plan view taken along line V—V of FIGURE 4.

Detailed description

As may be seen from a consideration of the drawings, the apparatus of the present invention comprises a rotatable drive shaft 10, a rotatable output ring member 11 driving an output shaft 12, and a fixed carrier 13 carrying in fixed peripheral relation, a plurality of second row rollers 14. The rollers 14 are in friction drive relation with the ring 11 and with first row rollers 15 which are, in turn, in friction drive relation with an axially split frusto-conical sun member composed of spaced elements 16 and 16a.

In the form illustrated in FIGURES 1 and 2, the input shaft 10 is coaxial with the output shaft 12 and is drivingly connected with the conical sun members 16 and 16a by way of oppositely directed helical threads 17 and 17a. These threads preferably provide a ball race anti-friction connection such that rotation of the drive shaft in the clockwise direction as viewed in FIGURE 1 will cause the members 16 and 16a to move closer together, whereas movement in the counterclockwise direction will cause the members 16 and 16a to move axially apart into wedging drive contact with the flared conical surfaces 15a of the rollers 15. The frusto-conical surfaces 15a are integral with the central cylindrical portion of the rollers 15 and, accordingly, axial separation of the members 16 and 16a will cause a preloaded drive condition and, accordingly, friction drive between the members 16, 16a and the rollers 15.

The central, cylindrical surface 15b of the rollers 15 is in friction drive contact with the surface of the rollers 14, as may be clearly seen from FIGURE 2. In turn, the rollers 14 are in drive relation with the internal surface of the ring 11. Accordingly, counterclockwise rotation of the shaft 10 will cause a drive condition to exist between the shaft 10 and the shaft 12. On the other hand, clockwise rotation of the shaft 10 will cause the members 16 and 16a to move axially toward each other pulling rollers 15 radially inward.

Axial movement of the members 16 and 16a towards each other is, of course, caused by the oppositely pitched helix grooves 17 and 17a, above described. The members 16 and 16a are normally biased apart by means of Belleville springs 20 which co-operate with the left-hand end of the member 16, as viewed in FIGURE 2, and the right-hand end of sleeve 21. The sleeve 21 is threaded on extension 22 of member 16a and is locked in adjusted position by means of a set screw 23. With this arrangement, the compressive force of the Belleville springs 20 may readily be adjusted to provide a relatively small biasing force tending to maintain the rollers 16, 16a in contact with the surfaces 15a of the rollers 15. Clockwise rotation of the shaft will cause the rollers 16, 16a to move axially out of contact with the surfaces 15a, a condition which will permit the rollers 15 to collapse radially toward the shaft 10. This radial movement will be accomplished in accordance with the present invention, since the rollers 14 are radially slidable, although peripherally positively spaced.

As may be clearly seen from FIGURE 1, each of the rollers 14 is rotatably mounted upon a shaft 25 which is provided with flats 26 fitted in radial slots 27 of the carrier 13. With this arrangement, the shafts 25 are fixed against rotation about their own axes but are permitted relatively free movement radially inwardly or outwardly from the position shown in FIGURE 1. A pair of annular spring rings 28 are positioned about the shafts 25 and provide a radial biasing force tending to maintain the shafts 25 radially inwardly in a position in which the rollers 14 are in drive contact with the rollers 15, and the rollers 15 are, in turn, in contact with the members 16, 16a. The rollers 14 are carried in an anti-friction manner by bearings 14a which are, in turn, mounted upon the non-rotational shafts 25. Each of the rollers 14 is provided with braking levers 30 pivotally carried by pins 31 and biased in clamping engagement with the shaft 25 by springs 32. The braking elements 30 are biased out of contact with the shafts 25 upon rotation of the rollers 14 at a speed sufficient for the centrifugal force caused by such rotation to move the members 30 radially. The exact speed of rotation necessary for this brake disengagement is, of course, dependent upon the mass of the members 30 and the adjustment of the spring 32. It is intended that the brakes 30 remain engaged at low speeds to insure a reaction force against the members 16, 16a causing them to expand the rollers 14 into engagement with the ring 11 at relatively low speeds, thereby avoiding undesirable slippage as the components engage.

It is, of course, realized that the drive between the oppositely coned surfaces 16a and 15a inherently provides slippage. This is true since the lineal surface speed of a frusto-conical surface increases as the radius increases. It has been found that this slippage is of insufficiently great magnitude to overcome the great advantages achieved through automatic drive control provided by the conical configuration. In addition to the automatic engagement aspects of the conical configuration, it will also be observed that such configuration makes the drive sensitive to the transmitted torque. The axial components of the preload on the conical surfaces introduce a tendency towards axial movement together of cones 16 and 16a. On the other hand, the axial forces developed in the screw proportional to the transmitted torque urge the cones axially apart. The increased torque will increase the drive preload and in the same way, will increase the axial components which tends to disengage the drive. By careful matching of the cone angle and helix angle of the power screw, the preload forces can be matched to the necessary preload for proper drive operation, and will keep balance and equilibrium. The drive will disengage at zero torque input if the springs 28 are selected of proper strength.

In the embodiment illustrated in FIGURES 1 and 2, the carrier 13 is fixed by any convenient means to the housing, such as for example, by a threaded projection 13a. In some installations it may be desirable to provide output at the carrier rather than the ring 11 and it will be understood, accordingly, that the carrier may, if desired, be provided with a sleeve output shaft concentric with the input shaft 10, in which event the ring would be secured to the fixed housing of the mechanism. In this regard, it will be observed that the present system has been described essentially as a planetary system, even though the embodiment illustrated in the drawings provides a construction in which the carrier is fixed. In view of the fact, however, that the carrier may be permitted to rotate, in which event the rollers 14 and 15 would partake of planetary action, the system is essentially one of the planetary type and is described as such.

A second embodiment of the invention is shown in FIGURES 3, 4 and 5. There, the input shaft 110 is provided with a sun member 116 in drive contact with first row planetary roller members 115 having a compound diameter, the larger of which is in contact with the sun member 116 and the smaller of which is in contact with the large diameter cylindrical surface of a second row of planet rollers 114. The smaller diameter surfaces of the planetary rollers 114 are, in turn, in drive relation with an axially split planetary roller system designated 117. The rollers 117 are peripherally fixed with respect to each other by means of a planet carrier 113 rotatably carrying the planets 117 by way of roller bearings 113a. Each of the planet members 117 is provided with a pair of cylindrical surfaces 117a for contact with the reduced diameter compound cylindrical surfaces of the planet rollers 114. Additionally, and at the outboard ends of said cylindrical surfaces 117a, frusto-conical surfaces 117b are provided. The surfaces 117b co-operate, in turn, with outwardly flaring frusto-conical surfaces 111a of axially split ring gear 111b and 111c. The ring members 111b, 111c are provided with a splined interconnection at 111d permitting axial separation of the parts 111b, 111c without peripheral relative rotation. The radially outward flaring surfaces 117b of the planets 117 prevent axial separation of the ring members 111b, 111c and it will be observed that attempted separation of the ring components will cause a tighter engagement, or increased preload, between the ring gear members and the planets 117. In the embodiment illustrated, the carrier 113 may be fixed relative to the outer housing 109 in any conventional manner, such as, for example, by way of rigid studs 108 being rigidly secured to the housing 109.

The ring members 111b, 111c transmit torque from the planets 117 to an output shaft 112 via an annular ring 120, rigidly carried by the shaft 112. Cam elements 121 and 122 seat in pockets 124 of ring 120 and 125 in ring members 111b, 111c. This arrangement is shown more clearly in FIGURE 5 where the cams 121 and 122 are shown to be positioned in a flaring relationship in which they are maintained equally balanced by means of springs 126. The springs 126 create a slight force tending to move the cam members 121 and 122 into a general straight-line or parallel relationship causing a slight wedging action of the ring members 111b, 111c with the flaring surfaces 117b of the planets 117. In the arrangement shown, attempted rotation of the plants 117 in one direction or the other will cause an automatic increase in wedging contact between the planets 117 and the ring members 111b, 111c with an increased transmission of torque. The device may constitute a one-way clutching mechanism by eliminating one or the other of sets of cams 121 or 122 and securing the thus freed end of the springs 126 to the annular ring 120.

The drive arrangement shown in FIGURES 3, 4 and 5 provides an improved system in permitting less relative sliding on the internal-external frusto-conical surfaces. This is true since the difference in diameter between the innermost and outermost contact areas of the frusto-conical surfaces are closer in dimension to each other in the arrangement in which the outer planets and ring gear are constructed in a conical manner than in the construction shown in FIGURES 1 and 2. Similarly, less axial motion is necessary with respect to the ring contact than with respect to the sun contact system in view of the high degree of rigidity provided at the ring compared to the sun in such multi-roller planetary systems. Further, the stresses applied to the ring are lower and the number of stress cycles per revolution of the system are smaller since the speed of rotation of the outermost planets is substantially lower than the speed of rotation of the innermost planets. Similarly, the heat dissipation of the system shown in FIGURES 3, 4 and 5 is superior since the planets of the last row of planet rollers may be substantially larger than possible at the innermost rollers such as illustrated in FIGURE 1.

To avoid distortion of the ring members 111b and 111c, and to assure proper contact throughout the periphery of the rings, the individual planets 117 are adjustable in length. Thus shims 117c may be provided, in combination with a cap screw 117d and nut 117e to permit one end of the roller 117 to be moved axially and rigidly locked in its adjusted position.

Due to the non-rotational control of the carriers 13 and/or 113, an auxiliary power take-off may be accomplished in an inexpensive manner. For example, as shown in FIGURE 4, a conventional gear unit 130 is secured to housing 109 and shaft 131 of the unit is splined to roller 117 coaxially thereof. Manifestly, such a take-off can be applied to any of the planet members, the advantage of using the last row planets 117 being that relatively low speed rotation may be provided at the shaft 131.

It will, of course, be apparent to those skilled in the art that variations may be made in the structure illustrated without departing from the novel concepts of this invention. It is, accordingly, my intention that the scope of the invention be limited solely by that of the hereinafter appended claims.

I claim as my invention:

1. A drive mechanism comprising a rotatable drive shaft, a sun member driven by said shaft, a plurality of rotatable rollers peripherally fixedly positioned relative to a carrier, an annular ring member, one of said members being axially split, each said roller having radially outwardly flared frusto-conical friction surfaces rigidly spaced by a cylindrical friction surface in drive relation with the other of said members, said one member comprising a pair of frusto-conical elements mating with the frusto-conical friction surfaces of said rollers, and means forcing the axially split parts of said one member apart upon rotation of the drive shaft in one direction and automatically increasing the force of separation with increased torque transmission between said members, whereby the drive contact pressures are increased between said sun, ring and rollers in said one direction of drive shaft rotation.

2. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof.

3. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof, said drive relation between said planet members and said ring comprising a second row of planets each of which is in drive contact with two of said planet members and said ring.

4. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof, said drive relation between said planet members and said ring comprising a second row of planet rollers each of which is in drive contact with two of said planet members and said ring, said carrier having radial slots therein carrying the axes of the planet rollers whereby said planet rollers are limited to radial motion relative to said carrier and the contact between said planet rollers and said planet members limits movement of said planet members to radial movement.

5. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof, said drive relation between said planet members and said ring comprising a second row of planet rollers each of which is in drive contact with two of said planet members and said ring, said carrier having radial slots therein carrying the axes of the second row of planet rollers whereby said rollers are limited to radial motion relative to said carrier and the contact between said planet rollers and said planet members limits movement of said planet members to radial movement, said spring means comprising an annular spring ring resiliently encircling the said planet rollers.

6. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet member, and means forcing said sun member elements apart upon rotation of the drive shaft in one direction and forcing them axially together upon reverse rotation thereof, said drive relation between said planet members and said ring comprising a second row of planet rollers each of which is in drive contact with two of said planet members and said ring, said carrier having radial slots therein carrying the axes of the planet rollers whereby said planet rollers are limited to radial motion relative to said carrier and the contact between said planet rollers and said planet members limits movement of said planet members to radial movement, and brake means frictionally retarding rotation of the planet rollers at low speeds but operable upon an increase in speed to centrifugally disengage.

7. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof, said last-named means comprising oppositely pitched helical thread connections between said drive shaft and said pair of frusto-conical sun member elements.

8. A one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive relation with said ring, said sun member comprising a pair of frusto-conical elements mating with the frusto-conical friction surfaces of said planet members, and means forcing said sun member elements apart upon rotation of the drive shaft in one direction and forcing them axially together upon reverse rotation thereof, said last-named means comprising oppositely pitched helical thread connections between said drive shaft and said pair of frusto-conical sun member elements, and including biasing means positioned between said sun members normally urging them axially apart into friction drive engagement with said planet members.

9. An automatically preloaded one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive contact with a second row of planet rollers which are in turn in drive contact with said ring, said sun member comprising a pair of frusto-conical friction surfaces of said planet members, means forcing said sun member elements apart upon rotation of the drive shaft in one direction thereof, said carrier having radial slots therein carrying the planet rollers and peripherally equally spacing them whereby said planet rollers are limited to radial motion relative to said carrier and the contact between said planet rollers and said planet members limits movement of said planet members to radial movement, and centrifugally released brake means frictionally retarding rotation of the planet rollers at low speeds but operable upon an increase in speed to centrifugally disengage.

10. An automatically preloaded one-way drive mechanism comprising a rotatable drive shaft, an axially split sun member, a plurality of rotatable planet members peripherally fixedly positioned relative to a carrier, an annular ring member, spring means radially inwardly urging said planet members, each said planet roller having radially outwardly flared frusto-conical friction surfaces rigidly spaced by a cylindrical friction surface in drive contact with a second row of planet rollers which are in turn in drive contact with said ring, said sun member comprising a pair of frusto-conical elements mating with the frusto-conical friction surfaces of said planet members, means forcing said sun member elements apart upon rotation of the drive shaft in one direction and forcing them axially together upon reverse rotation thereof, said carrier having radial slots therein carrying the planet rollers and peripherally equally spacing them whereby said planet rollers are limited to radial motion relative to said carrier and the contact between said rollers and said planet members limits movement of said planet members to radial movement, and brake means frictionally retarding rotation of the planet rollers at low speeds but operable upon an increase in speed to centrifugally disengage.

11. An automatically preloaded one-way drive mechanism comprising a rotatable drive shaft, an axially split sun member, a plurality of rotatable planet members peripherally fixed positioned relative to a carrier, an annular ring member, spring means radially inwardly urging said planet members, each said planet roller having radially outwardly flared frusto-conical friction surfaces rigidly spaced by a cylindrical friction surface in drive contact with a second row of planet rollers which are in turn in drive contact with said ring, said sun member comprising a pair of frusto-conical elements mating with the frusto-conical friction surfaces of said planet members, means between said pair of frusto-conical elements resiliently biasing them apart, and means forcing said sun member elements apart upon rotation of the drive shaft in one direction and forcing them axially together upon reverse rotation thereof, said carrier having radial slots therein carrying the planet rollers and peripherally equally spacing them whereby said planet rollers are limited to radial motion relative to said carrier and the contact between said planet rollers and said planet members limits movement of said planet members to radial movement, and brake means frictionally retarding rotation of the planet rollers at low speeds but operable upon an increase in speed to centrifugally disengage.

12. A drive mechanism constructed in accordance with claim 1 wherein the axially split one of said members comprises said ring members and including means returning the axially split parts of said one member together against relative peripheral movement but providing relative axial sliding movement.

13. The drive mechanism set forth in claim 1 wherein means is provided fixedly positioning said carrier against rotation.

14. The drive mechanism set forth in claim 13 including a power take-off shaft drivingly connected to one of said rollers by way of a shaft splined coaxially thereto.

15. A drive mechanism constructed in accordance with claim 12 wherein an output shaft is drivingly connected to said annular ring members by way of an annulus positioned axially between the split portions of the ring member, cam means positioned between said output shaft annulus and split ring members causing separation of said split ring members upon relative rotation between said output shaft and said split ring members in at least one direction of relative rotational movement thereof.

16. The drive mechanism of claim 15 wherein resilient means bias said ring members axially toward said planet roller friction surfaces.

References Cited

UNITED STATES PATENTS

| | | | |
|---|---|---|---|
| 1,718,846 | 6/1929 | Arter | 74—796 |
| 1,775,479 | 9/1930 | Arter | 74—796 |
| 3,207,004 | 9/1965 | Chery | 74—798 |
| 3,293,947 | 12/1966 | Chery | 74—796 |

FOREIGN PATENTS 112,015  1/1919  Great Britain.

DONLEY J. STOCKING, *Primary Examiner.*

THOMAS C. PERRY, *Assistant Examiner.*

U.S. Cl. X.R.

74—208; 292—217